United States Patent
Anerousis et al.

(10) Patent No.: US 11,062,088 B2
(45) Date of Patent: Jul. 13, 2021

(54) CONTEXTUAL AUTOMATION OF INFORMATION TECHNOLOGY CHANGE SERVICES

(71) Applicant: International Business Machines Corporation, Armonk, NY (US)

(72) Inventors: Nikolaos Anerousis, Chappaqua, NY (US); Anup Kalia, Elmsford, NY (US); Frederick Yung-Fung Wu, Greenwich, CT (US); Jin Xiao, Ossining, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/838,827

(22) Filed: Dec. 12, 2017

(65) Prior Publication Data
US 2019/0179894 A1    Jun. 13, 2019

(51) Int. Cl.
*G06F 17/27* (2006.01)
*G06F 40/30* (2020.01)
(Continued)

(52) U.S. Cl.
CPC ............ *G06F 40/30* (2020.01); *G06F 8/70* (2013.01); *G06F 9/445* (2013.01); *G06F 9/4451* (2013.01);
(Continued)

(58) Field of Classification Search
CPC ............ G06F 17/2785; G06F 16/242; G06F 16/3329; G06F 16/3344; G06F 16/367; G06F 17/278; G06F 17/2818; G06F 11/302; G06F 16/9577; G06F 8/70; G06F 9/4451; G06F 17/2775; G06F 17/2795;
(Continued)

(56) References Cited

U.S. PATENT DOCUMENTS 8,275,672 B1 * 9/2012 Nguyen ............. G06Q 20/1235
705/26.41
9,424,840 B1 * 8/2016 Hart ......................... G10L 15/22
(Continued)

*Primary Examiner* — Michael Ortiz-Sanchez
(74) *Attorney, Agent, or Firm* — Amin, Turocy & Watson, LLP

(57) ABSTRACT

Techniques facilitating causing a information technology change service action in response to a received instructive command are provided. In one example, a computer-implemented method can comprise receiving a command from a device, wherein an intent of the command relates to performing an information technology change service action. The computer-implemented method can also comprise determining the intent of the command and selecting a service from a federation of services based on the information indicative of the intent of the command. The computer-implemented method can further comprise ordering the service relative to another service of the federation of services based on a determined level of confidence that the service will facilitate performing the information technology change service action. Moreover, the computer-implemented method can comprise activating the service based on an order of the service relative to the other service and the information indicative of the intent of the command.

20 Claims, 10 Drawing Sheets

(51) Int. Cl.
*G06F 8/70* (2018.01)
*G06F 9/445* (2018.01)
*G06Q 10/06* (2012.01)
*G06F 11/30* (2006.01)

(52) U.S. Cl.
CPC ....... *G06F 11/302* (2013.01); *G06Q 10/0635* (2013.01); *G06Q 10/06313* (2013.01)

(58) Field of Classification Search
CPC ........ G06F 17/28; G06F 17/27; G06F 17/271; G06F 3/167; G06F 17/2765; G06F 17/30401; G06F 17/30554; G06F 17/273; G06F 17/274; G06F 17/30386; G06F 17/30389; G06F 17/30634; G06F 17/30654; G06F 17/30684; G06F 17/20; G06F 17/21; G06F 17/3043; G06F 16/9535; G06F 3/048; G06F 16/2425; G06F 16/24578; G06F 16/583; G10L 15/1822; G10L 2015/223; G10L 15/22; G10L 15/26; G10L 15/183; G10L 15/197; G10L 17/02; G10L 15/193; G10L 15/18; G10L 15/1815; G10L 17/22; G10L 2015/088; G10L 25/48; G10L 15/14; G10L 15/19; G10L 15/265; G10L 21/00; G10L 25/54; G10L 17/24; G10L 2021/02082; G10L 21/0232; H04M 1/271; H04M 2201/40; H04M 3/493; H04M 11/045; H04M 3/4936; G06Q 30/02; G06Q 30/0641; G06Q 20/12; G06Q 30/06; G06Q 30/0633; G06Q 30/0625; G06Q 30/0222; G06Q 30/0224; G06Q 30/0601; G06Q 20/102; G06Q 20/123; G06Q 20/145; G06Q 30/00; G06Q 30/0217; G06Q 30/04; G06Q 10/08345; G06Q 20/36; G06Q 30/0253
See application file for complete search history.

(56) References Cited

U.S. PATENT DOCUMENTS

| | | | |
|---|---|---|---|
| 9,548,050 B2* | 1/2017 | Gruber | G10L 15/22 |
| 9,721,570 B1* | 8/2017 | Beal | G10L 17/005 |
| 10,133,372 B2* | 11/2018 | Makela | G06F 3/038 |
| 10,236,017 B1* | 3/2019 | Witt-Ehsani | G10L 15/26 |
| 10,282,417 B2* | 5/2019 | Clark | G06F 16/337 |
| 10,395,655 B1* | 8/2019 | Kumar | G10L 15/1815 |
| 10,579,834 B2* | 3/2020 | Walia | G06F 40/232 |
| 2004/0186785 A1* | 9/2004 | Basil | G06Q 30/0601 705/26.1 |
| 2005/0033711 A1* | 2/2005 | Horvitz | G06F 16/3346 706/50 |
| 2011/0055699 A1 | 3/2011 | Li et al. | |
| 2011/0288906 A1* | 11/2011 | Thomas | G06Q 30/02 705/7.29 |
| 2011/0289076 A1 | 11/2011 | Boyle et al. | |
| 2014/0033071 A1* | 1/2014 | Gruber | G06Q 10/1097 715/752 |
| 2014/0089068 A1* | 3/2014 | Yehezkel | G06Q 30/0217 705/14.19 |
| 2014/0214404 A1 | 7/2014 | Kalia et al. | |
| 2014/0325254 A1 | 10/2014 | Mani et al. | |
| 2015/0100476 A1* | 4/2015 | Agapitov | A63F 13/85 705/39 |
| 2015/0149182 A1* | 5/2015 | Kains | G10L 15/18 704/275 |
| 2015/0205782 A1* | 7/2015 | Subramanya | G06Q 10/107 704/9 |
| 2016/0011902 A1 | 1/2016 | Agarwal et al. | |
| 2016/0019059 A1 | 1/2016 | Behnia et al. | |
| 2016/0042748 A1* | 2/2016 | Jain | G10L 25/48 704/9 |
| 2016/0085856 A1 | 3/2016 | Hall et al. | |
| 2016/0180369 A1* | 6/2016 | Thomas | G06Q 30/0224 705/14.25 |
| 2016/0212240 A1* | 7/2016 | Tuli | G06F 3/04817 |
| 2016/0218933 A1* | 7/2016 | Porras | H04L 63/20 |
| 2016/0219048 A1* | 7/2016 | Porras | H04L 41/147 |
| 2016/0335572 A1* | 11/2016 | Bennett | G06Q 10/06311 |
| 2017/0004588 A1* | 1/2017 | Isaacson | G06Q 20/40 |
| 2017/0018271 A1* | 1/2017 | Khan | G10L 15/14 |
| 2017/0054598 A1 | 2/2017 | Adam et al. | |
| 2017/0178038 A1 | 6/2017 | Guven et al. | |
| 2018/0018318 A1* | 1/2018 | Majumder | G06Q 50/01 |
| 2019/0066670 A1* | 2/2019 | White | G10L 15/22 |
| 2019/0138660 A1* | 5/2019 | White | G06F 16/9038 |
| 2019/0179607 A1* | 6/2019 | Thangarathnam | G10L 15/1815 |

* cited by examiner

CONTEXTUAL AUTOMATION OF INFORMATION TECHNOLOGY CHANGE SERVICES

BACKGROUND

The subject disclosure relates to automation of information technology change services, and more specifically, use of context to enable automation in increasingly complex information technology change services environments.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate supply noise voltage reduction and/or mitigation are described.

According to an embodiment, a system can comprise a memory and a processor to execute stored computer executable components. The computer executable components can comprise an instruction analysis component that determines a feature of an instructive command received in a natural language format, wherein the feature comprises information indicative of a first intent of the instructive command. The computer executable components can also comprise a service finder component that can order at least one service from a group of services based on the information indicative of the first intent of the instructive command. An execution component of the computer executable components, can perform, or cause to be performed, the at least one service to facilitate achieving the first intent of the instructive command According to another embodiment, a computer-implemented method can comprise receiving, by a system operatively coupled to a processor, a natural language command related to a request for information technology change service action. The method can also determine information indicative of an intent of the natural language command and can select a service based on the information indicative of the intent of the natural language command. The method can further initiate an information technology change service action based on the service and the information indicative of an intent of the natural language command.

According to another embodiment, a computer program product that facilitates determining information indicative of an intent of a command can comprise a computer readable storage medium having program instructions embodied therewith. The program instructions can be executable by a processor core. The program instructions can cause the processor core to receive the command from a device, wherein the intent of the command relates to performing an information technology change service action in a current computing environment related to the device generating the command. The program instructions can also cause the processor core to determine information indicative of the intent of the command and select a service from a federation of services based on the information indicative of the intent of the command. Moreover, the program instructions can cause the processor core to order the service relative to another service of the federation of services based on a determined level of confidence that the service will facilitate performing the information technology change service action and activate the service based on an order of the service relative to the other service and the information indicative of the intent of the command.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
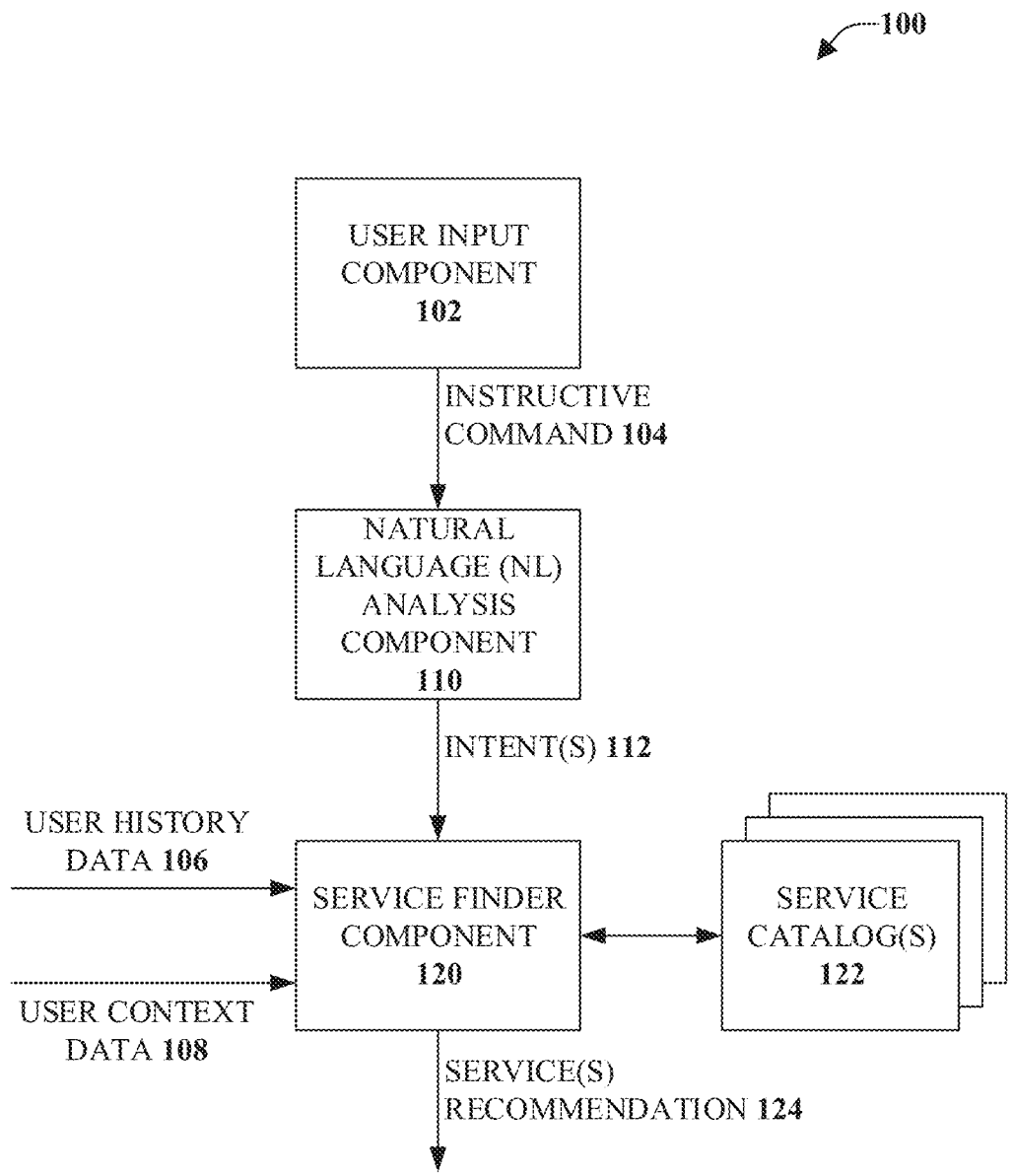
FIG. 1 illustrates a block diagram of an example, non-limiting system that facilitates providing a recommendation of information technology change service(s) based on an intent of an instructive command and a user context, in accordance with one or more embodiments described herein.

FIG. 1 illustrates a block diagram of an example, non-limiting system 100 that facilitates providing a recommendation of information technology change service(s) based on an intent of an instructive command and a user context, in accordance with one or more embodiments described herein. Aspects of systems (e.g., system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

As herein disclosed, providing a recommended information technology change service (ITCS) can be distinct from other automated systems for providing a response to a received instructive command (IC). ITCSs are becoming increasingly complex, are generally are highly parameterized, and are typically context dependent. Moreover, ICs received in a natural language (NL) format can frequently have one or more determined intents, and these determined intents, hereinafter simply intent or intents, can be associated with similar IT change actions or dissimilar IT change actions. Further, an ITCS can be associated with a risk to an IT system or violation of an IT service rule, for example a request to expand a database can be constrained by an amount of disk space that an entity has contracted for and performing the database expansion can incur costs that are not included in an existing contractual agreement with the entity. As such, use of existing NL technology for automating ITCS recommendations, etc., is not feasible. Therefore, by using additional information, IT change service automation can be improved, allowing corresponding improvements in efficiency and cost savings over conventional IT change service technologies that generally rely on human interpretation of a received IT change request instruction.

In various embodiments, the system 100 can be employed in any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, the system 100 can comprise user input component 102. User input component 102 can receive a user input and signal NL analysis component 110, e.g., instructive command 104 can be provided to NL analysis component 110 via user input received at user input component 102. In an embodiment, user input component 102 can receive a NL input. In some embodiments, user input component 102 can receive audio, video, or manual input(s). As some examples, a user can type in an input via a physical or virtual keyboard, a user can speak an input, a user can provide an input via facial expression, hand or finger movements, etc., or nearly any other form of user input. Moreover, different user input modes can be combined, for example, combining a verbal user input with touch inputs via a touch sensitive display, etc.

NL analysis component 110 can receive instructive command 104 from user input component 102. NL analysis component 110 can perform operations to determine an intent, e.g., intent(s) 112, from instructive command 104. As an example, a user can type in a command 'please move my database to a new disk' at user input component 102, which can be converted into an instructive command 104 'move my database to a new disk' that can be received by NL analysis component 110. NL analysis component 110 can then determine that the user intends that a database, e.g., 'my database', is to be moved from an existing location, e.g., the location currently associated with 'my database', to another location, e.g., a location associated with 'new disk'. This intent can be communicated as intent(s) 112.

System 100 can comprise service finder component 120 that can receive intent(s) 112. Service finder component 120 can determine services from one or more service catalog(s) 122 that correspond to intent(s) 112. In an embodiment, a level of correspondence can be ranked, sorted, or otherwise ordered. As an example, the aforementioned example intent of moving 'my database' between two locations can correspond to more than one service that moves a database, e.g., there can be a distinct database moving service for each of several different operating systems, different versions of the same operating system, different database types, different disk/storage types/brands/locations, different disk/storage performance characteristics, etc. As an example, in a first operating system, moving the example database to a new disk can include mounting the new disk prior to writing the database onto it, while in contrast, a second operation system can exclude mounting the new disk.

In an aspect, service finder component 120 can therefore receive user history data 106 and/or user context data 108 to facilitate selection of a service from service catalog(s) 122. User history data 106 can comprise a historical user action, a historical user IC, historical user profile data, etc. A user context can comprise a device environment, a software environment, a user identifier, a device identifier, an employer identifier, etc. In an embodiment, user history data 106 and/or user context data 108 can be employed to select some, none, or all services from service catalog(s) 122 in view of intent(s) 112. In an embodiment, user history data 106 and/or user context data 108 can be employed to sort, rank, or otherwise order some, none, or all services from service catalog(s) 122 in view of intent(s) 112. Accordingly, user history data 106 and/or user context data 108 can be used to determine service(s) recommendation 124. Service(s) recommendation 124 can therefore provide information related to one or more services that are determined or inferred to correspond to an intent of a received user input, e.g., via instructive command 104 and intent(s) 112.

In an embodiment, a user input can result in a complex or compound instructive command 104. Complex or compound instructive command 104 can comprise multiple corresponding intents, IT service actions, dependencies, etc. As an example, a user input can be 'expand my tablespace when my current table is nearly full'. In this example, the intent(s) 112 can correspond to expanding a tablespace corresponding to 'my tablespace' but the implementation of the IT service can be intended to be dependent upon 'my current table' being 'nearly full'. In this example, user history data 106 can be informative to selection of an appropriate service. As an example, user history can indicate that the user predominantly expands their tablespace when a table in use is 90% full. As such, service finder component 120 can recommend, for example, a table monitoring service and a table expansion service, via service(s) recommendation 124, to allow the current table to be monitored for remaining capacity and to trigger the tablespace expansion when the table reaches a threshold level determined by the user history data 106. Moreover, the service(s) recommendation 124 can include a delay service that defers the tablespace expansion, once triggered, until the user completes a current action, e.g., saves and closes the table, is determined to have moved away from the computer used to access the table for a sufficient period of time (such as by monitoring a user calendar, mobile phone location, etc.), or other indicia of a user providing sufficient time to perform the tablespace expansion without unduly disrupting the user's interaction with the 'current table'. As another example, a user input can be 'merge my databases on a new disk', which can be correlated to a compound action that copies 'my databases' onto a new disk and then merges them on the new disk.

Additionally, service finder component 120, in some embodiments, can determine and/or infer parameters from instructive command 104. In examples herein, terms such as 'my database', 'new disk', etc., can be vague in the absence of user history data 106 and/or user context data 108. Use of user history data 106 and/or user context data 108 can inform selection of services from service catalog(s) 122 based on determining parameters that are explicit, implicit, or absent in intent(s) 112 as a result of the user input at user input component 102. Use of user history data 106 and/or user context data 108 can be user to rank, order, sort, select, infer, etc., a candidate parameter from other parameters. As an example, 'my database' can be determined to be most likely indicating a database that is currently in use by the user as can be determined from user context data 108. This can be done by increasing a rank of a currently open database over other closed databases. Moreover, where multiple databases are open and in use, service recommendation 124 can be premised on verifying which database is to be operated on via an interaction between system 100 and a user or other verification system. As another example, 'my database' can be determined to be more likely indicating a database entitled "my_database" based on the user historically taking IT service actions with that particular database, as can be determined via user history data 106.

Figure 2:
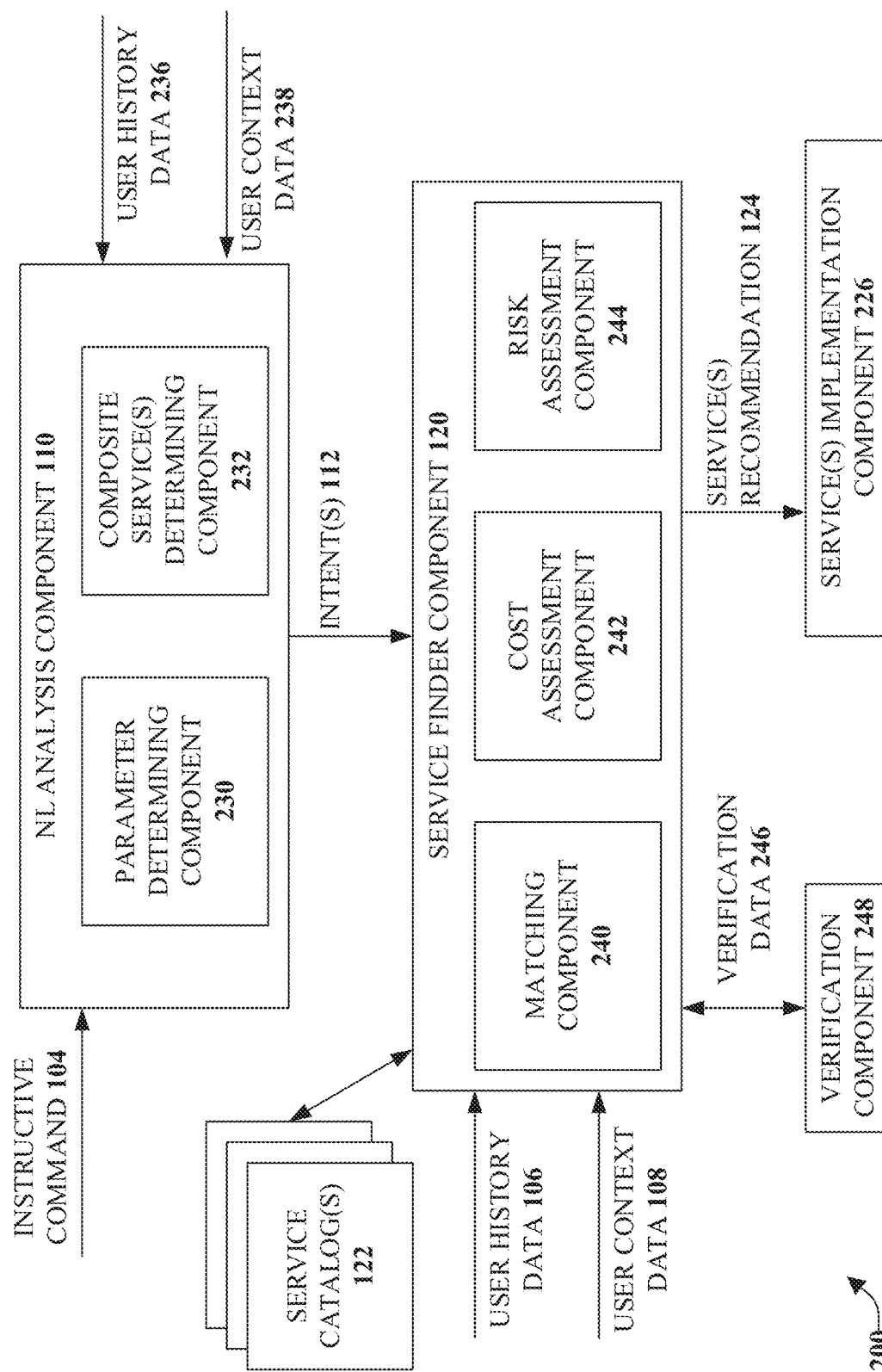
FIG. 2 illustrates a block diagram of an example, non-limiting system that facilitates implementing verified information technology change service(s) that are determined based on an intent of an instructive command and a user context, in accordance with one or more embodiments described herein.

Turning to FIG. 2, illustrated is a block diagram of an example, non-limiting system 200 that facilitates implementing verified information technology change service(s) that are determined based on an intent of an instructive command and a user context, in accordance with one or more embodiments described herein. Repetitive description of like elements employed in other embodiments described herein is omitted for sake of brevity. The system 200 can comprise one or more of the components and/or functionality of the system 100, and vice versa.

System 200 can comprise NL analysis component 110 that can comprise parameter determining component 230. NL analysis component 110 that can also comprise parameter determining component 230. NL analysis component 110 can receive user history data 236 and/or user context data 238. In an aspect, user history data 236 can be the same as, or different from, user history data 136, and/or user context data 238 can be the same as, or different from, user context data 138. As an example, user context data 238 can comprise an identifier for a computer in use by the user and a version number of a software package for interacting with a database while such information may be absent in user context data 108 (or go unused by service component 120). Recommended services, e.g., embodied in service(s) recommendation 124, can be implemented via service(s) implementation component 226. Service(s) implementation component 226 can initiate execution of IT change services to achieve IT change actions in accord with IC 104. Moreover, in some embodiments, service(s) implementation component 226 can perform the services to achieve IT change actions in accord with IC 104.

Parameter determining component 230 can determine or infer a parameter relative to instructive command 104. This parameter can be communicated to service finder component 120 via intent(s) 112. The determination or inference of a parameter by NL analysis component 110 can be facilitated by user history data 236 and/or user context data 238. Where instructive command 104 includes, for example, 'my database', a database can be determined or inferred from (or a rank/sort/etc. of possible databases can be updated) based on user history data 236 and/or user context data 238. As an example, 'my database' can be determined to be most likely an in-focus database based on user history data 236 and/or user context data 238.

Composite service(s) determining component 232 can similarly employ user history data 236 and/or user context data 238 to aid in determining a complex or compound service at NL analysis component 110, similar to that disclosed for service finder component 120 disclosed elsewhere herein. As such, complex or compound services can be conveyed to service finder component 120 via intent(s) 112.

Service finder component 120 can comprise matching component 240 that can facilitate matching intent(s) 112 to services comprised in service catalog(s) 122. In an aspect, matching can include determining a level of matching to facilitate ranking/sorting/etc., services, e.g., according to a level of match to intent(s) 112. As an example, a matching component can determine a type of operating system from user context data 108 and can determine that a first IT change service is higher ranked than a second IT change service relative to intent(s) 112 for the given type of operating system, which can result in either matching to the first service or updating a ranking of the first service to the second service accordingly. As such, other characteristics of the first and second services can also affect their ranking such that an appropriate service can be recommended via service(s) recommendation 124.

Service finder component 120 can comprise cost assessment component 242 that can determine a cost of one or more services to implement instructive command 104 based on intent(s) 112. In an aspect, where instructive command 104 results in different groups of services, whereby each group of services can accomplish instructive command 104, each group of services can be associated with different costs (wherein costs refer to monetary cost, time cost, delay cost, or nearly any other type of cost that can be associated with implementing a group of services or implementing different orderings of services in a group of services). Accordingly cost determinations can be employed in selecting a service or group of services comprised in service(s) recommendation 124. Cost can be used to select a service, update a rank/order/sort of a service, filter out services that do not meet rules related to cost, etc.

Service finder component 120 can comprise risk assessment component 244 that can determine a risk associated with one or more services able to implement instructive command 104 based on intent(s) 112. In an aspect, where instructive command 104 results in different groups of services, whereby each group of services can accomplish instructive command 104, each group of services can be associated with different risks or levels of risk, etc., for example, risk can refer to an amount of time that access by one or more users to an IT component can be delayed due to implementing instructive command 104 via a first group of services, which can be a different delay than for a second group of services. As another example, a risk of data loss as a result of implementing instructive command 1043 can be determined. As a further example, a risk of affecting a second IT component as a result of implementing instructive command 104 on a first IT component via a group of services can be determined. As such, risk can be factored into selection/ranking/sorting/filtering of services to including service(s) recommendation 124.

System 200 can further comprise verification component 248 that can facilitate verifying selection of a service or group of services via verification data 246. In an aspect, service finder component 120 can interact with a user or other verification system via verification component 248 to resolve ambiguities. As an example, where parameter determinations, e.g., via parameter determining component 230, etc., result in a parametric ambiguity, this ambiguity can be resolved via verification, such as where 'my database' can refer to one of two open and active databases, a query can be sent to the user via verification component 248 to select which database is intended. Of course, where the present disclosure relates to automating IT service changes, querying a user can preferably occur where automated determination of intent(s) 112 results in a determined level of ambiguity. As another example, where a first and second service produce sufficiently similar results at similar cost and similar risk, the selection of one or the other can be via verification by verification component 248. However, in this example, verification can be avoided where one or the other is simply selected as being equal to the other service. In an embodiment, the level of ambiguity can be selected to adjust how frequently verification is performed, e.g., where the level of ambiguity is set low, then verification can occur more often than where the level of ambiguity to trigger verification is set high. The level of ambiguity can be a user preference, set by contract, etc. Moreover, the level of ambiguity can be adapted over time so as to better reflect the changing preferences of a user in time, e.g., initial use of system 200 can have a low ambiguity threshold with a high level of user verification, but as the user becomes more comfortable with system 200, the ambiguity threshold can be increased (such as based on a user indication) so that fewer user verifications occur.

Figure 3:
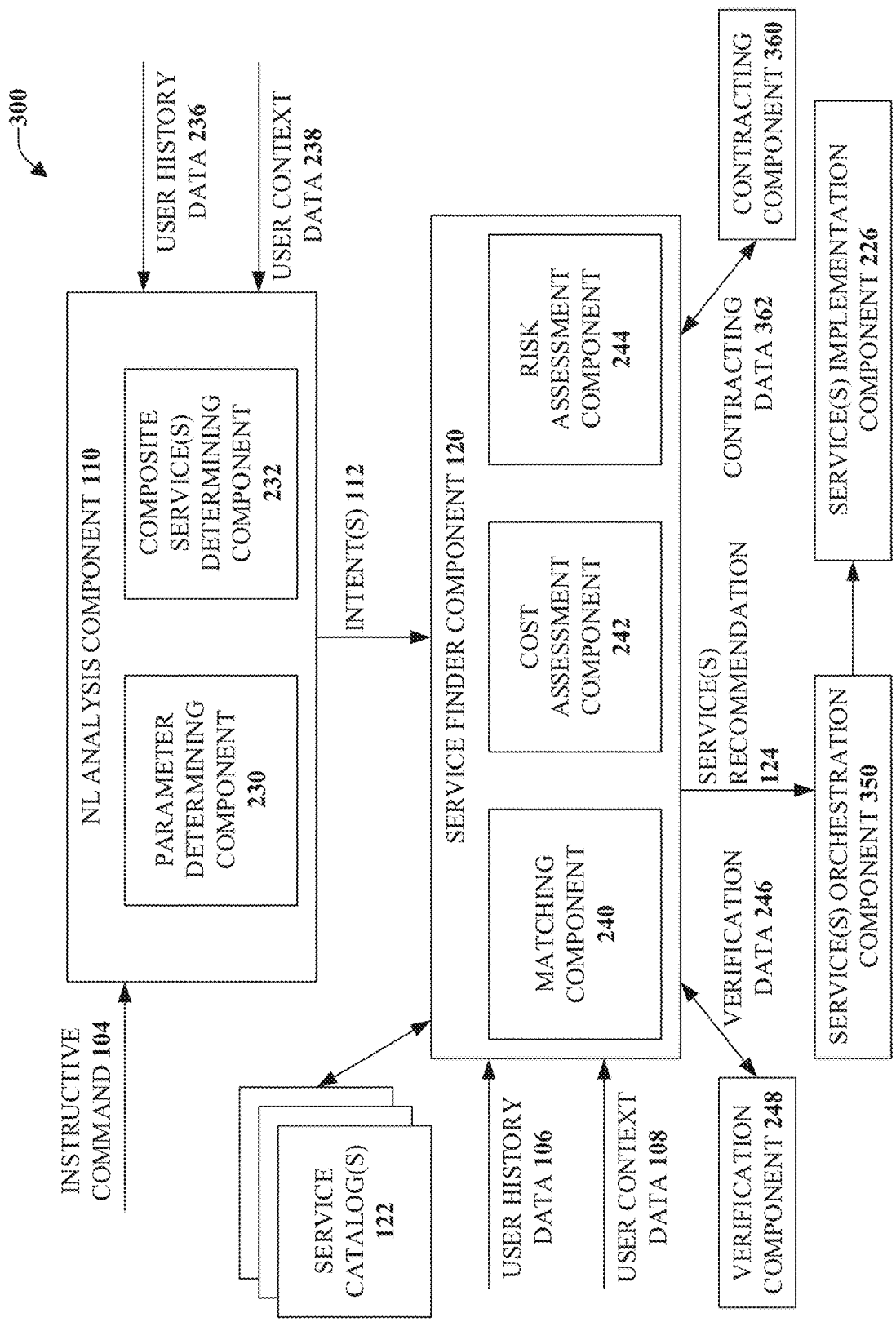
FIG. 3 illustrates a block diagram of an example, non-limiting system that facilitates implementing a contracted for information technology change service(s) that are determined based on an intent derived from an instructive command and a user context, in accordance with one or more embodiments described herein.

FIG. 3, illustrates a block diagram of an example, non-limiting system 300 that facilitates implementing a contracted for information technology change service(s) that are determined based on an intent derived from an instructive command and a user context, in accordance with one or more embodiments described herein. Repetitive description of like elements employed in other embodiments described herein is omitted for sake of brevity. The system 300 can comprise one or more of the components and/or functionality of the system 100, and vice versa.

System 300 comprises service(s) orchestration component 350 that can receive service(s) recommendation 124 from service finder component 120. Service(s) orchestration component 350 can organize or order recommended service(s) in a manner that can accomplish IC 104 in accord with verified IT change services. In an aspect, verification, e.g., via verification component 248 can reflect a most likely intent, e.g., intent(s) 112, via verification of one or more recommended services, that is, verification of preferred services via verification component 248 inherently validate or verify the goals of IC 104 as are embodied in the determined intent(s) 112. Where there are one or more IT change services recommended and/or validated, the order in which these services are performed, e.g., the order in which corresponding IT change service actions are implemented, can impact successfully achieving an IT change in accord with instructive command 104. As an example, where instructive command 104 corresponds to user input of 'I want to extend by DB2 tablespace', the corresponding IT services can comprise 'backup DB', 'shutdown DB', and 'extend tablespace' services. While this example is relatively simple, the order in which the services are performed or initiated can affect the ability to successfully achieve the intent of IC 104. As an example, where the tablespace is extended prior to shutting down the database, the database may undergo simultaneous user initiated changes that can cause error in the extension of the tablespace. As such, service(s) orchestration component 350 can order the implementation of the services, e.g., to first backup example database 'DB2', then to shut down 'DB2', then to extend the tablespace of 'DB2'.

In some embodiments, system 300 can comprise contracting component 360. Contracting component 360 can generate and receive data corresponding to contracting IT change service(s). In an aspect, these IT change service(s) can be verified, e.g., via verification component 248. Moreover, a contract for IT change service(s) can be based on price, speed at which the IT change service action will be implemented, existing contractual agreements, etc. As an example, a group of IT change services can be offered at one or more prices, such as for different speeds of implementation. A first example price can reflect immediate implementation of an IT change service action, while a second price can reflect a delayed IT change service action allowing the action to be batch processed, etc. Contracting component 360 can communicate with a user or entity associated with a user to receive ratification of one or more proposed contracts to perform IT change service(s). In some embodiments, a contract can be automatically ratified, e.g., where a controlling service agreement already exists that encompasses the performance of the recommended IT change service(s), etc. Where a contract is ratified, the IT change service(s) for the ratified contract can be then recommended via service(s) recommendation 124, orchestrated, e.g., via service(s) orchestration component 350, and implemented in accord with the ratified contract, e.g., via service(s) implementation component 226.

Figure 4:
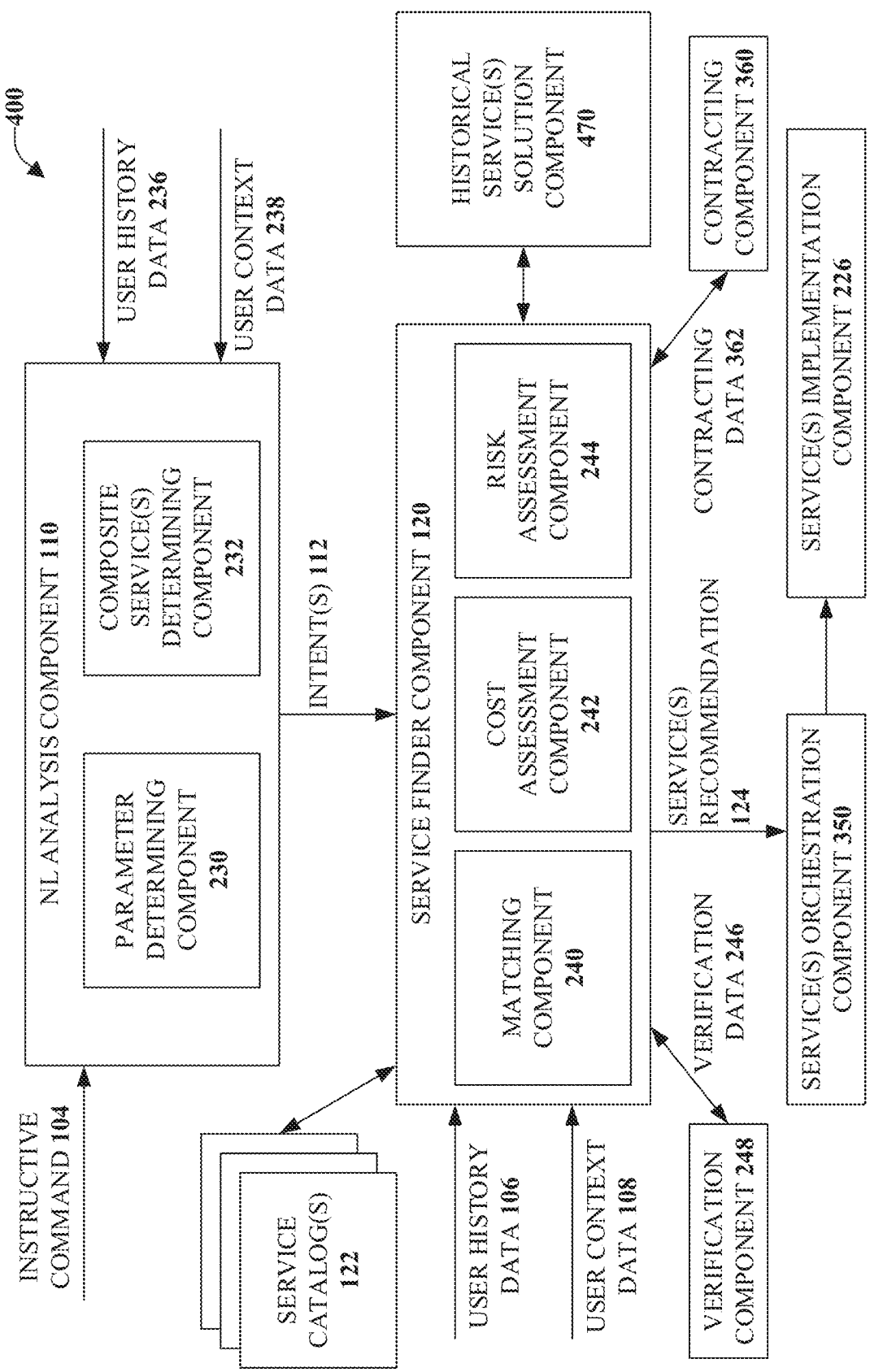
FIG. 4 illustrates a block diagram of an example, non-limiting system that facilitates implementing a contacted for information technology change service(s) that are determined based on historical solution(s), an intent of an instructive command, and a user context, in accordance with one or more embodiments described herein.

FIG. 4 illustrates a block diagram of an example, non-limiting system 400 that facilitates implementing a contacted for information technology change service(s) that are determined based on historical solution(s), an intent of an instructive command, and a user context, in accordance with one or more embodiments described herein. Repetitive description of like elements employed in other embodiments described herein is omitted for sake of brevity. The system 400 can comprise one or more of the components and/or functionality of the system 100, and vice versa.

As illustrated, system 400 can comprise historical service(s) solution component 470. Historical service(s) solution component 470 can comprise information corresponding to one or more previously employed service(s) recommendation 124 for a given intent(s) 112, based on IC 104. As such, where a current IC 104 is received that results in similar or same intent(s) 112 as a previous intent(s) 112, service finder component 120 can interact with historical service(s) solution component 470 to receive one or more IT change service recommendation. As an example, previous IT change service(s) recommended for 'replicate my database' can be received from historical service(s) solution component 470 in response to an IC 103 of 'copy my database' where both 'replicate my database' and 'copy my database' result in similar or same intent(s) 112. In an aspect, the results from historical service(s) solution component 470 can be in addition to, or in place of, other service(s) determined by service finder component 120. In this regard, where alternate services have become available to perform the intent(s) 112 correlated to IC 104, these alternate services may be distinct from services indicated by historical service(s) solution component 470. As such, these alternate services can be ranked/ordered/sorted/selected against historical service(s) solution component 470 recommended services.

In a further aspect, services recommended by historical service(s) solution component 470 can be employed to improve the search for services in service catalog(s) 122 by service finder component 120. Services indicated by historical service(s) solution component 470 as previously correlated to intent(s) 112 can indicate classes of serviced catalogs that may be particularly relevant to searching for relevant IT change service solutions. This can accelerate realization of relevant IT change services (that can be the same or different from those indicated by historical service(s) solution component 470) by service finder component 120. This can be especially true in situations where the volume of a federation of service catalogs is large or complex. In layman's terms, historical service(s) solution component 470 data can provide a good starting point for finding appropriate IT change services from catalogs of IT change services, e.g., service catalog(s) 122, even where service finder component 120 is not specifically restricted to recommending services indicated as historically appropriate by historical service(s) solution component 470. As an example, pricing or risk for historically appropriate services can be different in a current context and, as such, different services, e.g., those with lower prices or risks, etc., can be recommended by service finder component 120, however finding these alternate service can be accelerated based on the historically recommended services.

Figure 5:
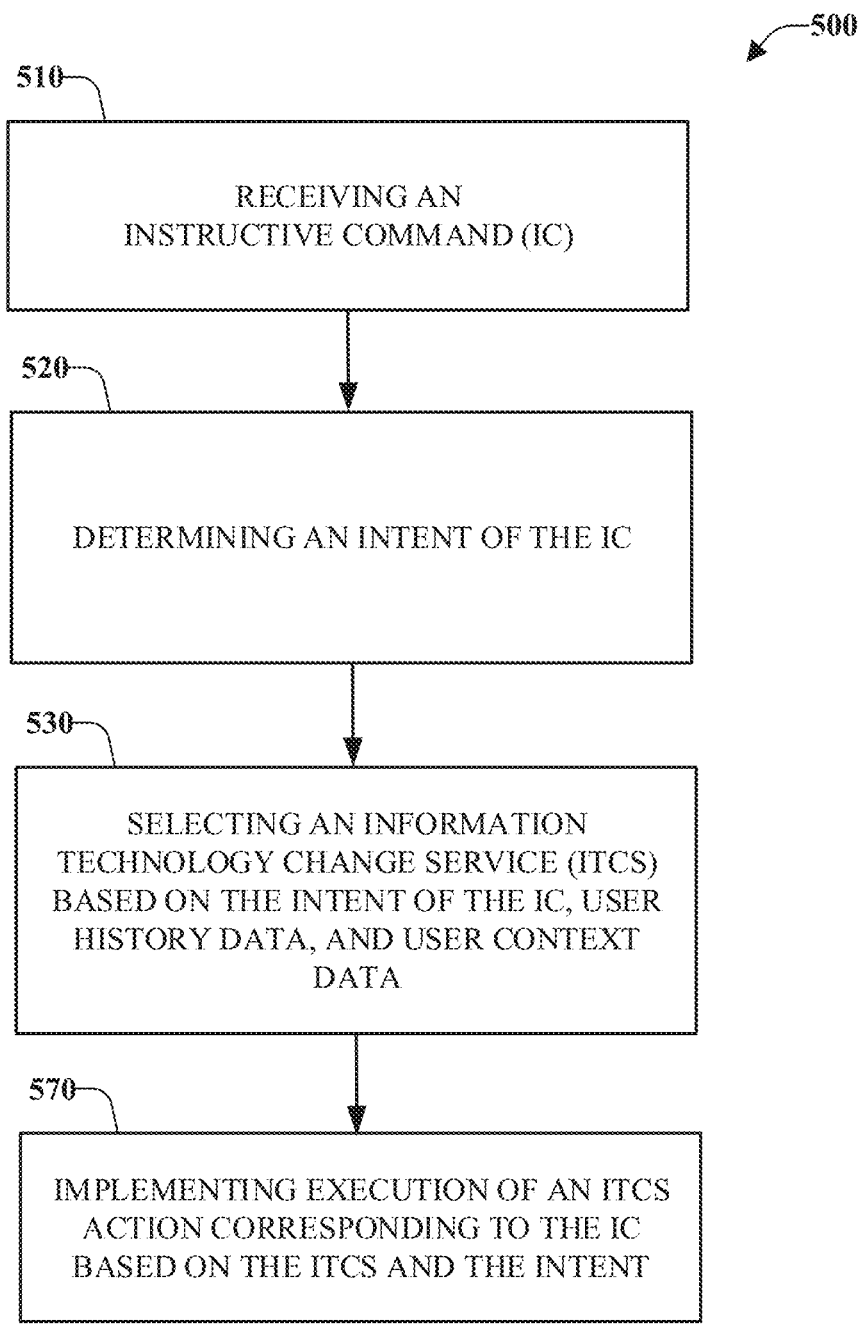
FIG. 5 illustrates a flow diagram of an example, non-limiting computer-implemented method that facilitates implementing an information technology change action based on information technology change service(s) selected in accord with an intent of an instructive command and a user context, in accordance with one or more embodiments described herein.

FIG. 5 illustrates a flow diagram of an example, non-limiting computer-implemented method 500 that facilitates implementing an information technology change action based on information technology change service(s) selected in accord with an intent of an instructive command and a user context, in accordance with one or more embodiments described herein. Repetitive description of like elements employed in other embodiments described herein is omitted for sake of brevity.

At 510, computer implemented method 500 can comprise receiving an instructive command (IC), e.g., from user input component 102, etc. The IC can be based on user input. In an aspect the user input can be a natural language (NL) input. In an embodiment the IC can be the same as the user input. In another embodiment the IC can be different than the user input. As an example, the user input can be 'please remove John's DB', which can result, an IC of 'delete John's database', etc.

At 520, method 500 can determine an intent of the IC, e.g., via NL analysis component 110, etc. In an aspect, some ICs can result in more than one intent, e.g., intent(s) 112, etc. The intent can be determined based on analysis of the IC. More particularly, where the IC retains some NL structure, the intent can be determined based on intelligent NL analysis. Moreover, an analysis of an IC can be based on historical user data, e.g., user history data 236, etc., and/or user context data, e.g., user context data 238, etc. It will be noted and appreciated that there can be more than one way of communicating the same intent, and conversely, there can be more than one intent drawn from the same IC. As such, the analysis at 520 can reflect one or more intents corresponding to the IC received at 510. As an example, an IC of 'extend my tablespace' can result in an intent reflecting extending a tablespace for a currently active table, extending a tablespace for a table titled 'my table', etc. Use of historical user data or user context can improve resolving determined (or inferred) intent(s), for example where the 'extend my tablespace' IC has recently been received from the user and it has been validated as extending the tablespace of 'my table', it can be determined/inferred that receiving this same IC again from the same user is more likely to intend to expand the tablespace of 'my table' and less likely to intend to expand the tablespace of another currently active table.

At 530, an information technology change service (ITCS) can be selected by method 500, e.g., via service finder component 120, etc. The ITCS can be selected based on an intent from 520, user history data, and user context, e.g., user history data 106, user context data 108, etc. As an example, an intent determined at 520 for the IC received at 510 can be employed with user history data and user context data to select one or more ITCS, such as, selecting 'backup DB', 'shutdown DB', and 'extend tablespace' ITCSs based on an intent derived from the IC received at 510. The parameter corresponding to which 'DB' can be provided by user history data and/or user context data, for example, 'DB' can be 'table_2010_07_04' based on the user context of currently interacting within table_2010_07_04.

At 570, method 500 can comprise implementing execution of an ITCS action corresponding to the IC and based on the ITCS and an intent, e.g., via service(s) recommendation 124, etc., via service(s) implementation component 226, etc. A selected ITCS from 530 can be implemented in conformance with an intent determined/inferred from the IC received at 510. As an example, an IC of 'export sales figures from my customer accounts to a new table' can result in an intent of creating a new table, an intent of populating the new table with data from the user's customer accounts, an intent of the data to populate the new table being restricted to sales figures, etc. Moreover a parameter that 'sales figures' relates to 'net sales' column data can be inferred/validated. Further a parameter that 'my customer accounts' relates to 'all active customer accounts for the user', wherein the use can be determined by user context data, can also be inferred/validated. This can enable the system of method 500 to select/rank/order/sort and validate/verify appropriate ITCSs to accomplish the intent(s) associated with the example IC. The ITCSs can then be implemented at 570, e.g., via service(s) implementation component 226, etc.

Figure 6:
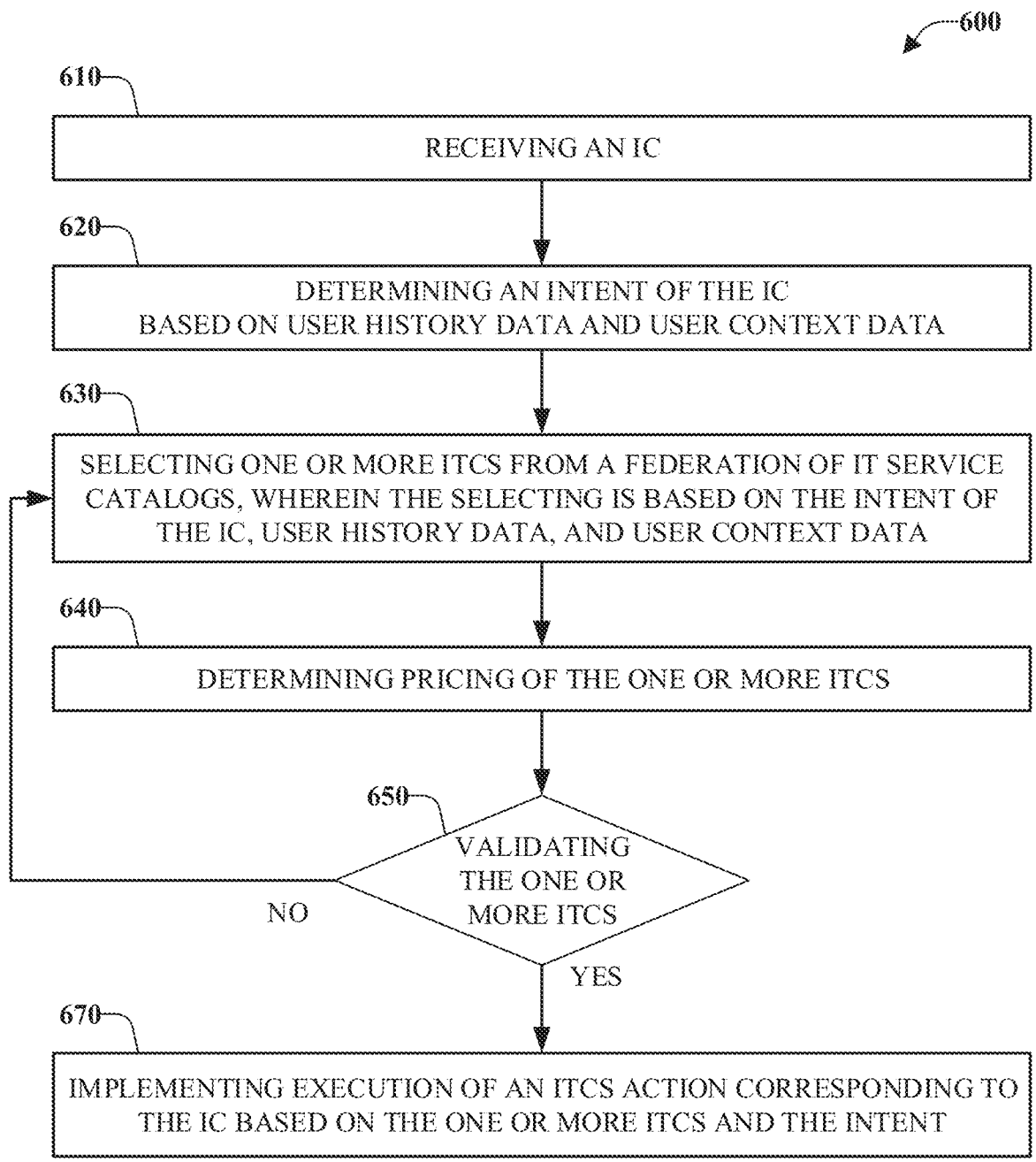
FIG. 6 illustrates a flow diagram of an example, non-limiting computer-implemented method that facilitates implementing an information technology change action based on validated information technology change service(s) selected in accord with an intent of an instructive command and a user context, in accordance with one or more embodiments described herein.

FIG. 6 illustrates a flow diagram of an example, non-limiting computer-implemented method 600 that facilitates implementing an information technology change action based on validated information technology change service(s) selected in accord with an intent of an instructive command and a user context, in accordance with one or more embodiments described herein. Repetitive description of like elements employed in other embodiments described herein is omitted for sake of brevity.

Method 600 can comprise receiving an IC at 610, determining an intent of the IC at 620, wherein the intent can be determined based on user history data and user context data such as user history data 236 and user context data 238, etc. and selecting one or more ITCSs from a federation of IT service catalogs at 630. The selecting of the ITCSs at 630 can be based on the intent from 620, user history data, e.g., user history data 106, etc., and user context data, e.g., user context data 108, etc.

At 640, method 600 can comprise determining pricing of the one or more ITCSs selected at 630, e.g., via cost assessment component 242, etc. In an aspect, different groups of ITCSs can be determined/selected at 630, whereby each group of ITCSs can accomplish the intent(s) of the IC from 610. In a further aspect, the different groups of ITCSs selected at 630 can be associated with corresponding prices and a price of a first group of ITCSs can be the same or different from another price of a second group of ITCSs. It is noted that a group of ITCSs can comprise one, some, none, or all available ITCSs from one or more service catalogs, e.g., service catalog(s) 122, etc. As such, at 630 no ITCS can be recommended, one ITCS can be recommended, more than one ITCS can be recommended in a single group, more than one ITCS group can be recommended, etc. At 640, a price can be associated with each ITCS and/or ITCS group selected at 630.

These prices and the corresponding groups of ITCSs can be validated at 650 of method 600, e.g., via verification component 248, etc. As an example, a first ITCS group can have a first price and this can be validated, for example via a query to the user, indicating the IT service and corresponding price. The user can then indicate that they do not want the proposed ITCS group at the proposed price, e.g., the ITCS group can be too costly, etc., or the ITCS group can comprise services that the user does not want to use. Alternately, the user can indicate that they do want to use the proposed ITCS group at the proposed price. In a further embodiment, the user can select IT change services within the ITCS group such that the ITCS group is not validated but that some of the services within the ITCS group are indicated as desired by the user or not desired by the user. In this embodiment, this additional information can be used to improve further recommended ITCSs, e.g., via not validating the one or more ITCS at 650, but using the indication related to sub-ITCSs of the ITCS group in a subsequent ITCS group recommendation.

Where the ITCS is validated at 650, method 600 can, at 670, implement execution of an ITCS action corresponding to the IC based on the one or more ITCSs and the intent, e.g., via service(s) implementation component 226, etc. In an embodiment, at 670, the validation of the ITCS at 650 can facilitate method 600 initiating or executing the ITCSs at the priced determined at 640. The ITCSs can be one or more ITCS. As an example, an IC of 'add 1 TB of disk to my VM' can comprise ITCSs of backing up the VM disk, selecting additional disk space of approximately 1 TB, assigning the additional disk space to the VM, etc. These ITCSs can be associated with an ala carte price or a group price that was validated at 650. As such, at 670, the group of validated ITCSs can be initiated or executed by method 600.

Figure 7:
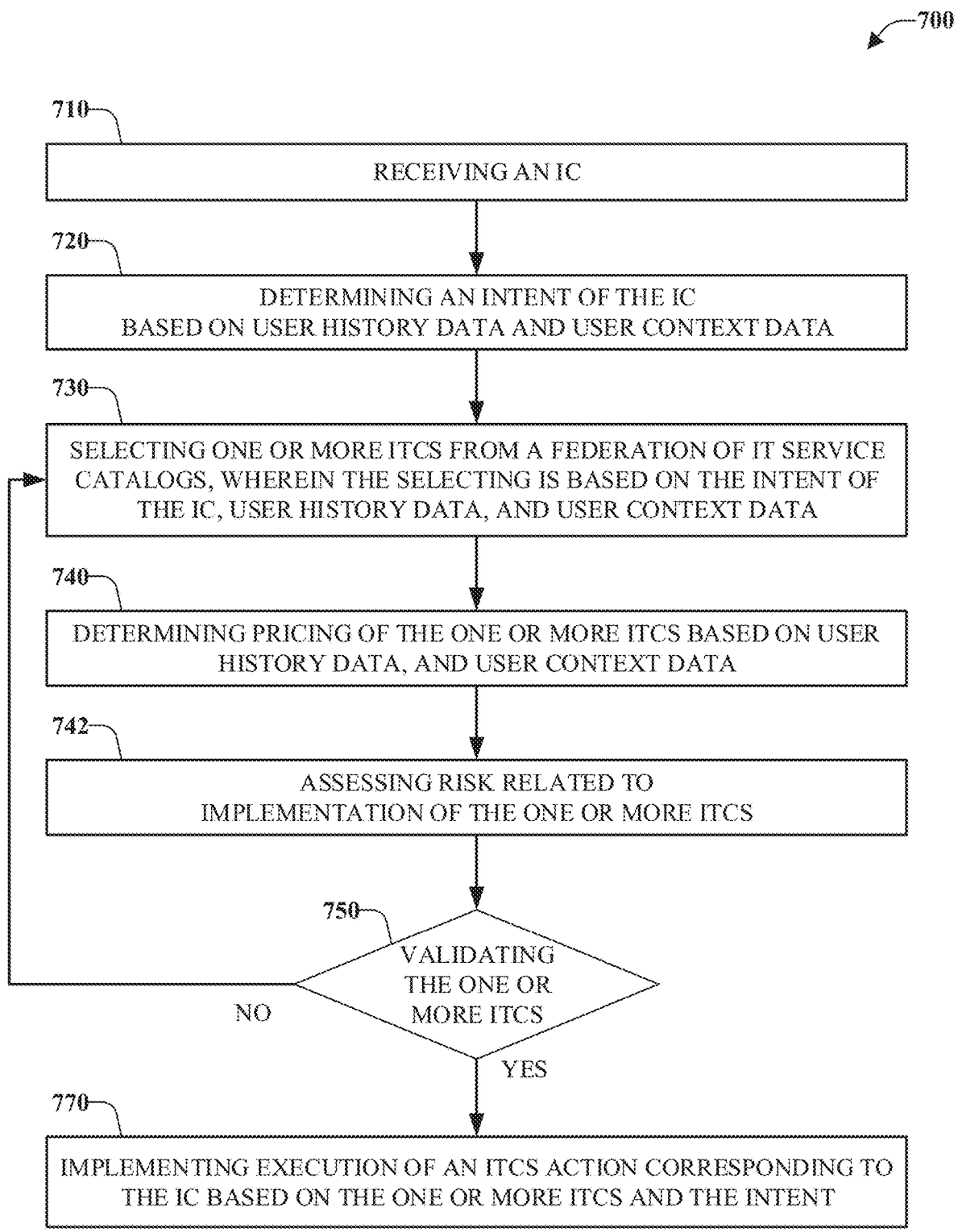
FIG. 7 illustrates a flow diagram of an example, non-limiting computer-implemented method that facilitates implementing an information technology change action based on validated information technology change service(s) selected in accord with a corresponding price, assessed risk, an intent of an instructive command and a user context, in accordance with one or more embodiments described herein.

FIG. 7 illustrates a flow diagram of an example, non-limiting computer-implemented method 700 that implements implementing an information technology change action based on validated information technology change service(s) selected in accord with a corresponding price, assessed risk, an intent of an instructive command and a user context, in accordance with one or more embodiments described herein. Repetitive description of like elements employed in other embodiments described herein is omitted for sake of brevity.

Method 700 can comprise receiving an IC at 710, determining an intent of the IC at 720, wherein the intent can be determined based on user history data and user context data such as user history data 236 and user context data 238, etc. and selecting one or more ITCSs from a federation of IT service catalogs at 730. The selecting of the ITCSs at 730 can be based on the intent from 720, user history data, e.g., user history data 106, etc., and user context data, e.g., user context data 108, etc.

At 740, method 700 can comprise determining pricing of the one or more ITCSs selected at 730, e.g., via cost assessment component 242, etc. In an aspect, different groups of ITCSs can be determined/selected at 730, whereby each group of ITCSs can accomplish the intent(s) of the IC from 710. In a further aspect, the different groups of ITCSs selected at 730 can be associated with corresponding prices and a price of a first group of ITCSs can be the same or different from another price of a second group of ITCSs. It is noted that a group of ITCSs can comprise one, some, none, or all available ITCSs from one or more service catalogs, e.g., service catalog(s) 122, etc. As such, at 730 no ITCS can be recommended, one ITCS can be recommended, more than one ITCS can be recommended in a single group, more than one ITCS group can be recommended, etc. At 740, a price can be associated with each ITCS and/or ITCS group selected at 730.

At 742, a risk, or level of risk, can be assessed, e.g., via risk assessment component 244, etc. The risk assessment can be related to a risk of implementing the one or more ITCSs. In an aspect, an IT change can impact the IT structure, access to IT resources, delay interaction with an IT system, incur costs outside an agreement for IT services for an entity, etc. As such, a risk or level of risk can be correlated to selected ITCSs from 730. As an example, extending a tablespace on a disk of fixed size can result in damage to the table environment where the extended table space is not possible or writes into disk space reserved for other uses. As such, an IC indicating adding too much tablespace can result in returning a high level of risk, an indication of possible effects of implementing the IC, an indication that the IC is not possible due to the assessed risk, etc. The risk assessed at 742 can be communicated in the validation at 750, employed to adjust a rank/sorting/ordering of selected ITCSs prior to validating one or more ITCS or group of ITCSs, etc.

At 750, a selected ITCS or group of ITCSs can be validated. The validation can reflect the price from 740 and risk from 742. At 770, a validated ITCS or group of ITCSs can be implemented by method 700.

Figure 8:
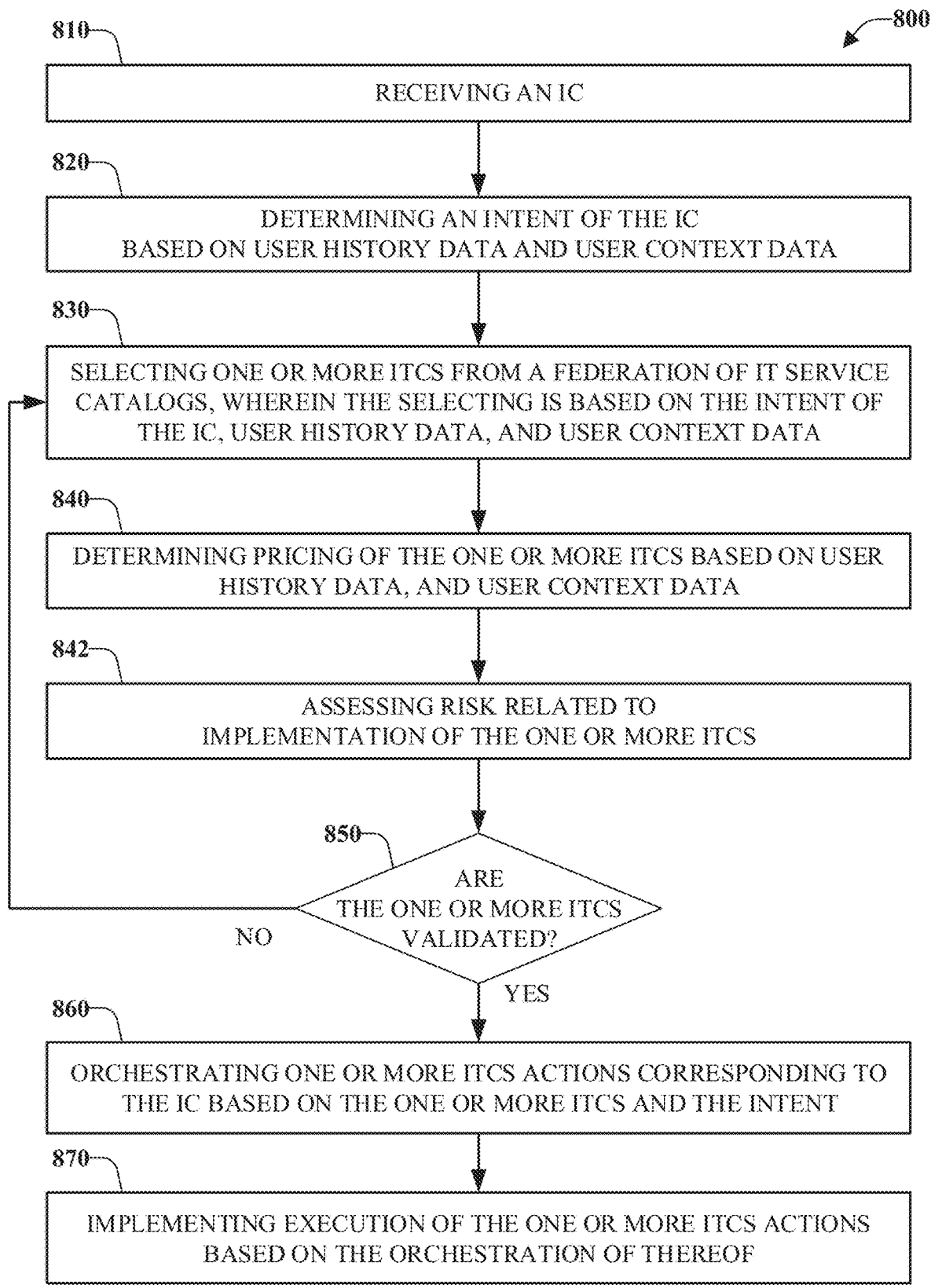
FIG. 8 illustrates a flow diagram of an example, non-limiting computer-implemented method that facilitates implementing orchestrated information technology change actions based on information technology change service(s) selected in accord with an intent of an instructive command and a user context, in accordance with one or more embodiments described herein.

FIG. 8 illustrates a flow diagram of an example, non-limiting computer-implemented method 800 that implements implementing orchestrated information technology change actions based on information technology change service(s) selected in accord with an intent of an instructive command and a user context, in accordance with one or more embodiments described herein. Repetitive description of like elements employed in other embodiments described herein is omitted for sake of brevity.

Method 800 can comprise receiving an IC at 810, determining an intent of the IC at 820, wherein the intent can be determined based on user history data and user context data such as user history data 236 and user context data 238, etc. and selecting one or more ITCSs from a federation of IT service catalogs at 830. The selecting of the ITCSs at 830 can be based on the intent from 820, user history data, e.g., user history data 106, etc., and user context data, e.g., user context data 108, etc.

At 840, method 800 can comprise determining pricing of the one or more ITCSs selected at 830. In an aspect, different groups of ITCSs can be determined/selected at 830, whereby each group of ITCSs can accomplish the intent(s) of the IC from 810. In a further aspect, the different groups of ITCSs selected at 830 can be associated with corresponding prices and a price of a first group of ITCSs can be the same or different from another price of a second group of ITCSs. It is noted that a group of ITCSs can comprise one, some, none, or all available ITCSs from one or more service catalogs, e.g., service catalog(s) 122, etc. As such, at 830 no ITCS can be recommended, one ITCS can be recommended, more than one ITCS can be recommended in a single group, more than one ITCS group can be recommended, etc. At 840, a price can be associated with each ITCS and/or ITCS group selected at 830.

At 842, a risk, or level of risk, can be assessed. The risk assessment can be related to a risk of implementing the one or more ITCSs. In an aspect, an IT change can impact the IT structure, access to IT resources, delay interaction with an IT system, incur costs outside an agreement for IT services for an entity, etc. As such, a risk or level of risk can be correlated to selected ITCSs from 830. As an example, extending a tablespace on a disk of fixed size can result in damage to the table environment where the extended table space is not possible or writes into disk space reserved for other uses. As such, an IC indicating adding too much tablespace can result in returning a high level of risk, an indication of possible effects of implementing the IC, an indication that the IC is not possible due to the assessed risk, etc. The risk assessed at 842 can be communicated in the validation at 850, employed to adjust a rank/sorting/ordering of selected ITCSs prior to validating one or more ITCS or group of ITCSs, etc. At 850, a selected ITCS or group of ITCSs can be validated. The validation can reflect the price from 840 and risk from 842.

At 860, a validated ITCS or group of ITCSs can be orchestrated, e.g., via service(s) orchestration component 350, etc. The orchestration, e.g., sorting, ordering, or otherwise arranging the one or more ITCSs, can be performed based on the intent determined at 820 for the IC received at 810. As disclosed elsewhere herein, the order in which ITCSs are implemented can affect the performance of actions relative to an IC. In an aspect, the orchestration at 860 can enable performance or initiation of an ITCS in a preferred manner. As an example, where a database should be backed up prior to extending the disk space associated with the database, e.g., based on IT service best practices, the orchestration of the ITCSs can implemented a database backup prior to an extension of the database disk space. As another example, where an order of operations for ITCS actions does not matter from an implementation standpoint, the orchestration can order the ITCS actions to conserve IT resources, e.g., batching performance of some ITCS actions, delaying an ITCS action to a lower use period, etc. At 870, the execution of the one or more orchestrated ITCS actions can be implemented. In an aspect, a system performing method 800 can perform or cause to be performed the ITCS actions in an orchestrated manner and in accord with the IC received at 810 based on the intent(s) determined at 820 and as validated at 850 based on the selection, price, and risk from 830, 840, and 842 respectively.

Figure 9:
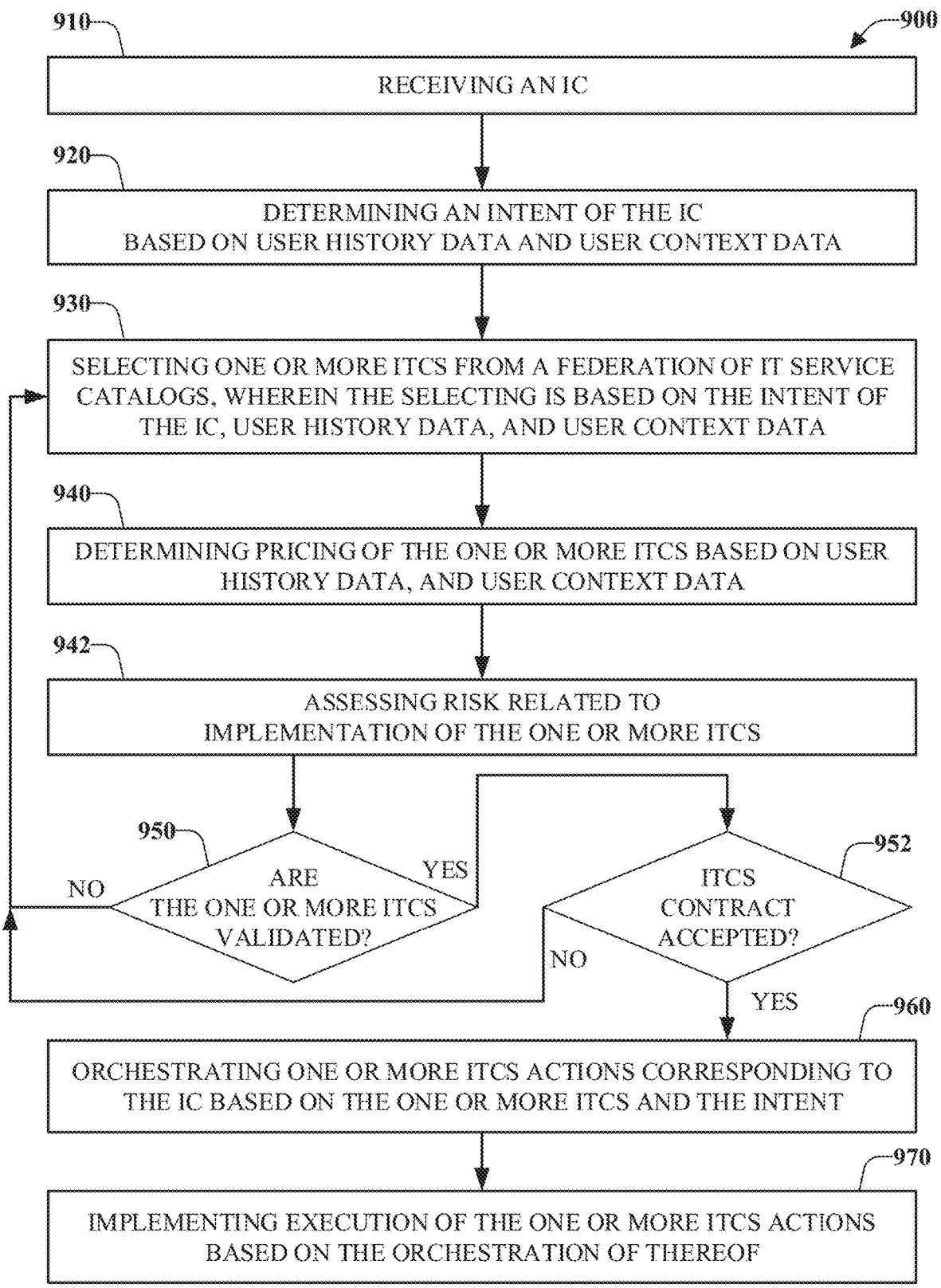
FIG. 9 illustrates a flow diagram of an example, non-limiting computer-implemented method that facilitates implementing orchestrated information technology change actions based on contracted for information technology change service(s) selected in accord with an intent of an instructive command and a user context, in accordance with one or more embodiments described herein.

FIG. 9 illustrates a flow diagram of an example, non-limiting computer-implemented method 900 that enables implementing orchestrated information technology change actions based on contracted for information technology change service(s) selected in accord with an intent of an instructive command and a user context, in accordance with one or more embodiments described herein. Repetitive description of like elements employed in other embodiments described herein is omitted for sake of brevity.

Method 900 can be similar to method 800 and can comprise contract ratification. Method 900 can comprise receiving an IC at 910, determining an intent of the IC at 920, wherein the intent can be determined based on user history data and user context data such as user history data 236 and user context data 238, etc. and selecting one or more ITCSs from a federation of IT service catalogs at 930. The selecting of the ITCSs at 930 can be based on the intent from 920, user history data, e.g., user history data 106, etc., and user context data, e.g., user context data 108, etc. At 940, a price for the one or more ITCS can be determined. At 942, risk, or level of risk, for implementing the one or more ITCS can be assessed. At 950, the selected one or more ITCS can be validated. The validation can be based on the selected one or more ITCS, the corresponding price, and/or the corresponding assessed risk.

At 952, a validated one or more ITCS can be embodied in a contract that can be ratified or refused, e.g., via contracting component 360, etc. Where a contract is refused, further one or more ITCS can be validated and an affiliated contract can be selectively ratified. A contract can comprise selected one or more ITCS, price, speed/time/delay, ascribed risks/disclaimers, etc. Moreover, the contract can be ratified manually, e.g., via interaction with a user, user manager, entity, etc., or can be automatically ratified, e.g., premised on existing contractual agreements, etc. Once the contract has been ratified/accepted at 952, the one or more ITCS can be orchestrated at 960 and implemented at 970.

Accordingly, unlike conventional IT change service technologies, the disclosed subject matter can enable automation of an IT service change, more especially via a natural language IT service change request, and in a manner that can reduce or eliminate manual interactions, while enabling selection of appropriate ITCSs to accomplish the determined intent(s) of the IC. This can be in sharp contrast to current IT service change technologies that can rely heavily on human/manual interaction to determine what IT change services to employ in regard to a IT service change request received from a user. This can be an improvement by allowing automation to select from a federation of IT service change catalogs that can exceed the expertise of a human operator, by automatically determining corresponding prices and associated risks, by automating validation/verification of proposed ITCSs, by automating contracting of validated ITCSs, etc. As IT service environments continue to proliferate, the disclosed subject matter can readily adapt and remain expert in selecting/pricing/proposing ITCSs in a manner that far outpaces the ability of a human operator, more especially in highly contextual conditions that may exceed the abilities of conventional NL processing.

Figure 10:
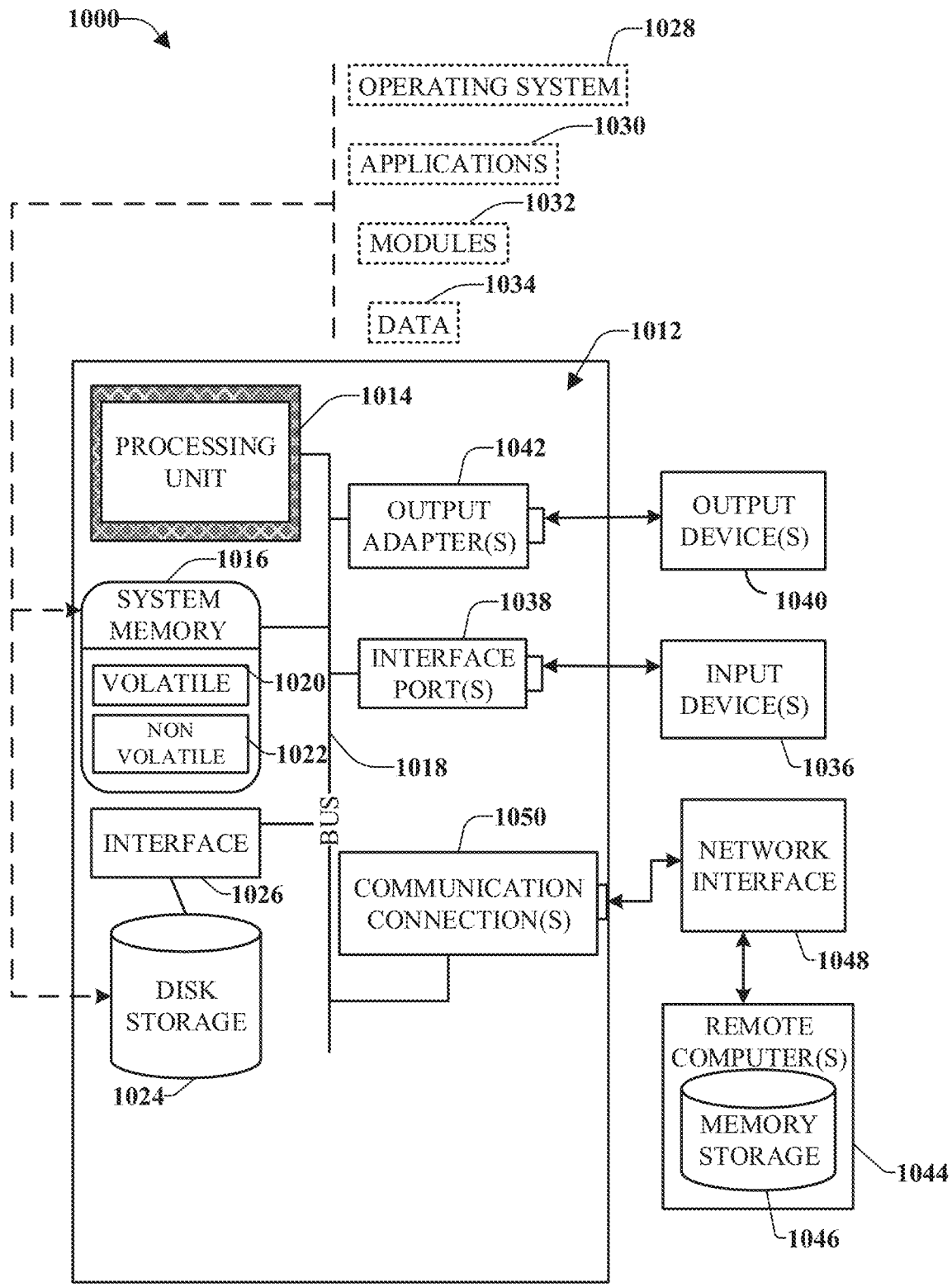
FIG. 10 illustrates a block diagram of an example, non-limiting operating environment in which one or more embodiments described herein can be facilitated.

FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 can couple system component(s) including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/ software employed to connect the network interface 1048 to the system bus 1018. While communication connection 1050 is shown for illustrative clarity inside computer 1012, it can also be external to computer 1012. The hardware/ software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible embodiments of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative embodiments, the functions noted in the blocks can occur out of the order noted in the Figures. For example, two blocks shown in succession, in fact, can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or may, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
an instruction analysis component that:
determines a feature of an instructive command received in a natural language format, wherein the feature comprises information indicative of a first intent of the instructive command, wherein the first intent is distinct from the first instructive command;
a verification component that:
validates a price for one or more services from a service catalog via a query to a user; and
queries the user as to whether the user accepts the price or declines the price;
a service finder component that:
infers the first intent based on user history data and user context data; and
ranks the one or more services from a service catalog based on the inferred first intent, the price of the one or more services and whether the user has accepted the price or declined the price; and
an execution component that performs at least one of the one or more services based on the ranking, wherein the instructive command is a compound instructive command comprising a natural language feature corresponding to at least a first information technology change service action and the system also determines a cost of the information technology change service action to implement the command based on the intent, wherein the cost is modified to a modified cost based on a level of risk that the information technology change service action is outside of an existing contractual agreement and whether the information technology change service action will be immediately implemented or delayed to allow batch processing.

2. The system of claim 1, wherein a second information technology change service action that modify a computer system or database thereby enabling context-sensitive automation of information technology change services, and wherein the compound instructive command is associated with the first intent and at least one other intent, wherein the first intent and the at least one other intent are distinct intents, and wherein the first intent and the at least one other intent are distinct from the compound instructive command.

3. The system of claim 1, wherein the computer executable components further comprise:
an instruction context component that determines a context corresponding to the instructive command thereby enabling context-sensitive automation of information technology change services; and
a risk assessment component that determines a risk associated with the one or more services to implement the first instructive command, wherein the risk is at least one of a delay due to implementing the first instructive command or a risk of data loss as a result of implementing the first instructive command.

4. The system of claim 3, wherein the service finder component further ranks one or more of the services based on context corresponding to the instructive command.

5. The system of claim 4, wherein:
the context comprises a historical context comprising data corresponding to a previous instructive command for a profile associated with the instructive command, and
the instruction analysis component employs a historical use of the previous instructive command to determine the first intent of the instructive command.

6. The system of claim 3, wherein:
the context comprises a historical context comprising a previous device environment having a defined relationship that is the same as another relationship of a current device environment associated with the instructive command, and
the instruction analysis component employs a historical intent associated with the previous device environment to determine the first intent of the instructive command.

7. The system of claim 3, wherein
the context comprises a historical context comprising a previous software operating environment that is the same as a current software operating environment associated with the instructive command, and
the instruction analysis component employs a historical intent associated with the previous software operating environment to determine the first intent of the instructive command.

8. The system of claim 4, wherein:
the context comprises identification of a current software operating environment, and
the instruction analysis component employs the current software operating environment to determine the first intent of the instructive command.

9. The system of claim 4, wherein:
the context comprises identification of a current device environment, and
the instruction analysis component employs the current device environment to determining the first intent of the instructive command.

10. A computer-implemented method, comprising:
receiving, by a system operatively coupled to a processor, a natural language command related to a request for information technology change service action;
determining, by the system, information indicative of an intent of the natural language command, wherein the intent is distinct from the natural language command and is determined based on user history data;
selecting, by the system, a service based on the information indicative of the intent of the natural language command, and ordering of one or more services from which the service is selected;
initiating, by the system, an information technology change service action based on the service and the information indicative of an intent of the natural language command; and
determining, by the system, a cost of the information technology change service action to implement the natural language command based on the intent, wherein the cost is modified to a modified cost based on a level of risk that the information technology change service action is outside of an existing contractual agreement and whether the information technology change service action will be immediately implemented or delayed to allow batch processing.

11. The computer-implemented method of claim 10, wherein the information indicative of the intent of the natural language command indicates a first information technology change service action and a second information technology change service action, wherein the first information technology change service action modifies the second information technology change service action.

12. The computer-implemented method of claim 11, wherein:
the selecting the service comprises selecting the service from a group of services, and
the computer-implemented method further comprises ranking the service against another service of the group of services based on the information indicative of the intent of the natural language command.

13. The computer-implemented method of claim 10, further comprising determining, by the system, a context corresponding to the natural language command that facilitates context-sensitive automation of information technology change services.

14. The computer-implemented method of claim 13, wherein:
the context corresponding to the natural language command comprises a historical natural language command for a device associated with generating the natural language command, and
the historical natural language command facilitates the determining the information indicative of the intent of the natural language command.

15. The computer-implemented method of claim 13, wherein:
the context corresponding to the natural language command comprises an indication of a historical software environment of a device associated with generating the natural language command, and
the indication of the historical software environment facilitates the determining the information indicative of the intent of the natural language command.

16. A computer program product that facilitates determining information indicative of an intent of a command, the computer program product comprising a computer readable storage medium having program instructions embodied therewith, the program instructions are executable by a processor core to cause the processor core to:
receive the command from a device, wherein the intent of the command relates to performing an information technology change service action in a current computing environment related to the device generating the command, wherein the intent is distinct from the command;
determine the information indicative of the intent of the command, wherein the information indicative of the intent embodies the information technology change service action;
determine a cost of the information technology change service action to implement the command based on the intent, wherein the cost is modified to a modified cost based on a level of risk that the information technology change service action is outside of an existing contractual agreement and whether the information technology change service action will be immediately implemented or delayed to allow batch processing;
select a service from a federation of services based on the information indicative of the intent of the command;
order the service relative to another service of the federation of services based on a determined level of confidence that the service will facilitate performing the information technology change service action and based on the modified cost; and
activate the service based on an order of the service relative to the other service and the information indicative of the intent of the command.

17. The computer program product of claim 16, wherein:
the command is received in a natural language format, and
the determining the information indicative of the intent of the command comprises:
parsing the command into command elements, and
analyzing a relationship between a first element of the command elements and a second element of the command elements to enable determining the information indicative of the intent of the command based on the relationship.

18. The computer program product of claim 16, wherein the current computing environment related to the device generating the command is analyzed relative to a historical computing environment related to the device generating the command to facilitate determining the information indicative of the intent of the command based on historical intent corresponding to the historical computing environment.

19. The computer program product of claim 18, wherein the historical computing environment related to the device generating the command comprises a historical software environment.

20. The computer program product of claim 18, wherein the historical computing environment related to the device generating the command comprises a historical command from the device.

* * * * *